(12) United States Patent
Cusano

(10) Patent No.: US 8,485,829 B2
(45) Date of Patent: Jul. 16, 2013

(54) SYSTEM AND A METHOD FOR SIMULATING A MANUAL INTERVENTIONAL OPERATION BY A USER IN A MEDICAL PROCEDURE

(75) Inventor: Corrado Cusano, Rome (IT)

(73) Assignee: DIES S.r.l., Rome (IT)

(*) Notice: Subject to any disclaimer, the term of this patent is extended or adjusted under 35 U.S.C. 154(b) by 1043 days.

(21) Appl. No.: 11/996,169

(22) PCT Filed: Jul. 19, 2006

(86) PCT No.: PCT/EP2006/007093
§ 371 (c)(1),
(2), (4) Date: May 20, 2008

(87) PCT Pub. No.: WO2007/009763
PCT Pub. Date: Jan. 25, 2007

(65) Prior Publication Data
US 2008/0286735 A1    Nov. 20, 2008

(30) Foreign Application Priority Data

Jul. 20, 2005 (EP) ...................................... 05291563

(51) Int. Cl.
*G09B 23/28* (2006.01)
(52) U.S. Cl.
USPC ........... 434/267; 434/219; 434/262; 434/272; 434/323; 434/365; 434/403; 434/429; 345/156; 345/418; 345/419; 345/619; 382/128; 382/276; 382/293; 703/2; 703/11
(58) Field of Classification Search
USPC .......... 434/323, 219, 365, 403, 429, 262.267, 434/272; 382/128, 276, 293; 345/156, 418, 345/419, 619; 703/2, 11
See application file for complete search history.

(56) References Cited

U.S. PATENT DOCUMENTS

| 4,907,973 A | 3/1990 | Hon | |
|---|---|---|---|
| 5,487,172 A * | 1/1996 | Hyatt | ............................... 712/32 |

(Continued)

FOREIGN PATENT DOCUMENTS

| EP | 0970662 A1 | 1/2000 |
|---|---|---|
| WO | WO 2004026178 A2 * | 4/2004 |

(Continued)

OTHER PUBLICATIONS

Annex to the European Search Report dated Mar. 20, 2007 in corresponding European Patent Application No. EP05291563.

*Primary Examiner* — Jack Yip
(74) *Attorney, Agent, or Firm* — Roberts Mlotkowski Safran & Cole P.C.

(57) ABSTRACT

The present invention deals with a system (1) for simulating a manual interventional operation by a user (2) on a simulated body with at least two real instruments (3, 4, 5), comprising a longitudinal track (8), a plurality of carriages (9, 10, 11) moveable along said track, each carriage having clamping means (25), and means for rotating and moving longitudinally said real instrument. It also comprises feed back means (18) for receiving and transmitting to the user hand (19) a feed back force from said real instrument with respect t simulation characteristic, means (17) for recognizing a real instrument to be fit within said clamping means, said clamping means (25) comprising first electromagnetic means (26) with an hollow part for receiving the real instrument to be secured therein, second electro-magnetic means (27) with a protruding part for pressing at least a part of said real instrument within said hollow part while said electromagnetic means are actuated and electric means for supplying or not electric current to the first and second magnetic means to be actuated accordingly, whereby said real instrument can be secured within said clamping means to be moved longitudinally and rotated by the user.

17 Claims, 6 Drawing Sheets

U.S. PATENT DOCUMENTS

| | | | |
|---|---|---|---|
| 5,800,179 A | 9/1998 | Bailey | |
| 5,821,920 A | 10/1998 | Rosenberg et al. | |
| 6,037,948 A * | 3/2000 | Liepa | 345/582 |
| 6,217,525 B1 * | 4/2001 | Medema et al. | 600/508 |
| 6,249,287 B1 | 6/2001 | Yamrom | |
| 6,452,596 B1 * | 9/2002 | Gueziec et al. | 345/440 |
| 6,538,634 B1 | 3/2003 | Chui et al. | |
| 6,756,978 B1 * | 6/2004 | Chen et al. | 345/419 |
| 7,113,623 B2 * | 9/2006 | Chen et al. | 382/128 |
| 2002/0168618 A1 * | 11/2002 | Anderson et al. | 434/262 |
| 2003/0068607 A1 * | 4/2003 | Gregorio et al. | 434/262 |
| 2003/0088389 A1 * | 5/2003 | Balaniuk et al. | 703/2 |
| 2003/0108853 A1 * | 6/2003 | Chosack et al. | 434/262 |
| 2004/0059284 A1 * | 3/2004 | Nash et al. | 604/30 |
| 2004/0157199 A1 * | 8/2004 | Eggert et al. | 434/262 |
| 2004/0249617 A1 * | 12/2004 | Lau et al. | 703/2 |
| 2005/0010326 A1 * | 1/2005 | Hayward et al. | 700/182 |
| 2005/0018885 A1 * | 1/2005 | Chen et al. | 382/128 |
| 2005/0187461 A1 * | 8/2005 | Murphy et al. | 600/416 |
| 2005/0277096 A1 * | 12/2005 | Hendrickson et al. | 434/262 |
| 2006/0129228 A1 * | 6/2006 | Golesworthy et al. | 623/1.16 |
| 2006/0149522 A1 * | 7/2006 | Tang | 703/11 |
| 2006/0234195 A1 * | 10/2006 | Grund-Pedersen et al. | 434/262 |
| 2006/0235669 A1 * | 10/2006 | Charbel et al. | 703/11 |
| 2007/0148626 A1 * | 6/2007 | Ikeda | 434/272 |

FOREIGN PATENT DOCUMENTS

| | | |
|---|---|---|
| WO | WO 2004051602 A1 * | 6/2004 |
| WO | 2007009764 A1 | 1/2007 |

* cited by examiner

SYSTEM AND A METHOD FOR SIMULATING A MANUAL INTERVENTIONAL OPERATION BY A USER IN A MEDICAL PROCEDURE

FIELD OF THE INVENTION

The present invention is related to a system and a method for simulating a manual interventional operation by a user in a medical procedure.

It is more particularly, but not exclusively related to endoscopic procedures such as bronchoscopy, laryngoscopy, gastroscopy, colonoscopy, arthoroscopy, laparoscopy or ureteroscopy.

BACKGROUND

In the field of medical procedure simulation there exists a need for improved devices and methods which will authorize better realistical portray of an actual surgical procedure.

This is due to the fact that performance of endoscopic procedure requires skill to avoid complications that may cause important injury to a patient.

In case of angioplasty-balloon procedure for instance, the surgeon should direct a guide wire, a catheter and a sheath through arteries to a blockage point and inflate a balloon to withdraw the blockage.

This has to be done while avoiding numerous complications, such as hurting an artery and creating hemoragy.

Therefore these practionners imperatively need to develop expertise in order to ensure successful operations.

Training on live patients is efficient but need a skilled physician to supervise and avoid serious injuries to the patient.

It also needs the use of hospital facilities and equipment, and of course live patients to allow sufficient experience to perform these types of procedure.

That is why simulation has occurred in this field with expertise originally coming from simulating procedures used in other fields such as aeronautics or vehicle driving.

The prior art which has attempted to overcome the above described disadvantages of live patients to train physicians is basically disclosing (see for instance U.S. Pat. No. 4,907,973) expert simulator system for modeling realistic internal environment having a mock tool such as an endoscope inserted and manipulated within a model. The model has a mock bodily region to be monitored and a plurality of sensors to detect the position of the tool (an endoscope) within the body.

A computer is used for representing the views observed from the measured endoscope position during a real operation.

Such systems present disadvantages.

The use of physical models restricts training to particular bodily regions, obliges simplification as a model cannot contain the same complex anatomy than a real body, and also is not providing feedback on the applied force.

In order to be more realistic it has then been developed (see for instance U.S. Pat. No. 5,821,920) a medical procedure simulation system that utilizes virtual reality technology. Such system includes a display device and programmable tactile/force reflecting mechanisms that provide force feedback to generate the feeling of medical instrument and the interaction of the instruments with a simulated anatomy.

But such systems of the prior art are also suffering of some disadvantages concerning both the way the feedback is provided to the physician coming from the difficulty of grasping correctly elongated object such as an endoscope, thereby degrading the accuracy of object motion measurements, and the difficulty of realistically simulating such instrument during a medical procedure with all the different positions and orientations which can be provided in real life, as well as with several instruments provided simultaneously.

SUMMARY

Accordingly, it is an object of the present invention to allow enhanced training of medical procedure to surgeons by providing better accuracy on the feedback forces together with more realistic simulation of a plurality of situations involving a plurality of tools.

It is therefore a main object of the present invention to provide improved system and method for simulating a manual interventional operation by a user which are better than those presently known for fulfilling the requirements of practice, particularly in that they provide a better grasp of the tools and make it possible to simulate real operations more accurately than in the past.

Another object of the present invention is related to the particular efficiency of new algorithms which are implemented for obtaining such realistic results. To this end, the present invention provides a system for simulating a manual interventional operation by a user on a simulated body with at least two real instruments, wherein said device comprises a longitudinal track, a plurality of moveable carriages along said track, each carriage having clamping means for securing one of said real instruments to said corresponding carriage, means for rotating and moving longitudinally said real instrument, visuals means, processing means for simulating a medical procedure and providing visual elements on said visual means and feed back means for receiving and transmitting to the user hand a feed back force from said real instrument with respect to simulation characteristic, characterised in that it comprises means for recognizing a real instrument to be fit within said clamping means, said clamping means comprising first electro-magnetic means with an hollow part for receiving the real instrument to be secured therein, second electro-magnetic means with a protruding part for pressing at least a part of said real instrument within said hollow part while said electromagnetic means are actuated and electric means for supplying or not electric current to the first and second magnetic means to be actuated accordingly, whereby said real instrument can be secured within said clamping means to be moved longitudinally and rotated by the user.

Advantageously the first electro-magnetic means comprise a generally cylindrical block having a broader center part for receiving a solenoid and a longitudinal hollow channel for receiving said real instrument.

In an other advantageous embodiment the second electro-magnetic means comprise a block having a central protruding part, said block being provided with a central spine arranged to cooperate with the instrument when inserted in the longitudinal hollow.

Also advantageously the generally cylindrical block comprises three parts connected together, i.e. a first part which is cylindrical and comprises a funnel or conical hollow element that authorises insertion of the guide of the tool by progressive guiding into an axial cylindrical channel provided inside said part in the prolongation of such conical entry, a parallelepipedic second part or central part integrally connected to the first part, forming said broader center part, made of magnetic material and arranged to cooperate with the second element, said central part including a central and axial prolongation of channel, which is half cylindrical on its inferior part and opened on its superior part such as the part presents a plane interconnecting superior surface with second element, on which is affixed the negative or positive pole of the electromagnet clamping means, and a third part, with a central channel in the prolongation of channels, symmetrical to first part with regard to the center part.

The bloc having a central protruding part comprises a parallelepipedic element on which is affixed the positive or negative pole of the electromagnet clamping means.

Advantageously the system further comprises two ball bearings, into which are inserted the elements for rotation around a central axis.

The invention also provides a method of simulating an interventional operation on a human or animal body, said method comprising the steps of modelling the internal system such as the cardiovascular system of said body with a mesh geometry, while in the embodiment of the present invention particularly described here, using accurate clamping means as above described and/or simulating blood pressure, and/or collision with heart attacks and/or expansion produced during the cure of stenosis.

In advantageous embodiments, recourse is further had to one and/or other of the following arrangements:
the spasms are simulated;
it further comprises the step of modelling the contrast fluid diffusion in relation with the veins elasticity, and the possible presence of stenosis.

The invention will be better understood from reading the following description of particular embodiment, given by way of non limiting example.

BRIEF DESCRIPTION OF SEVERAL VIEWS OF THE DRAWINGS

The description refers to the accompanying drawings, in which.

DETAILED DESCRIPTION

Figure 1:
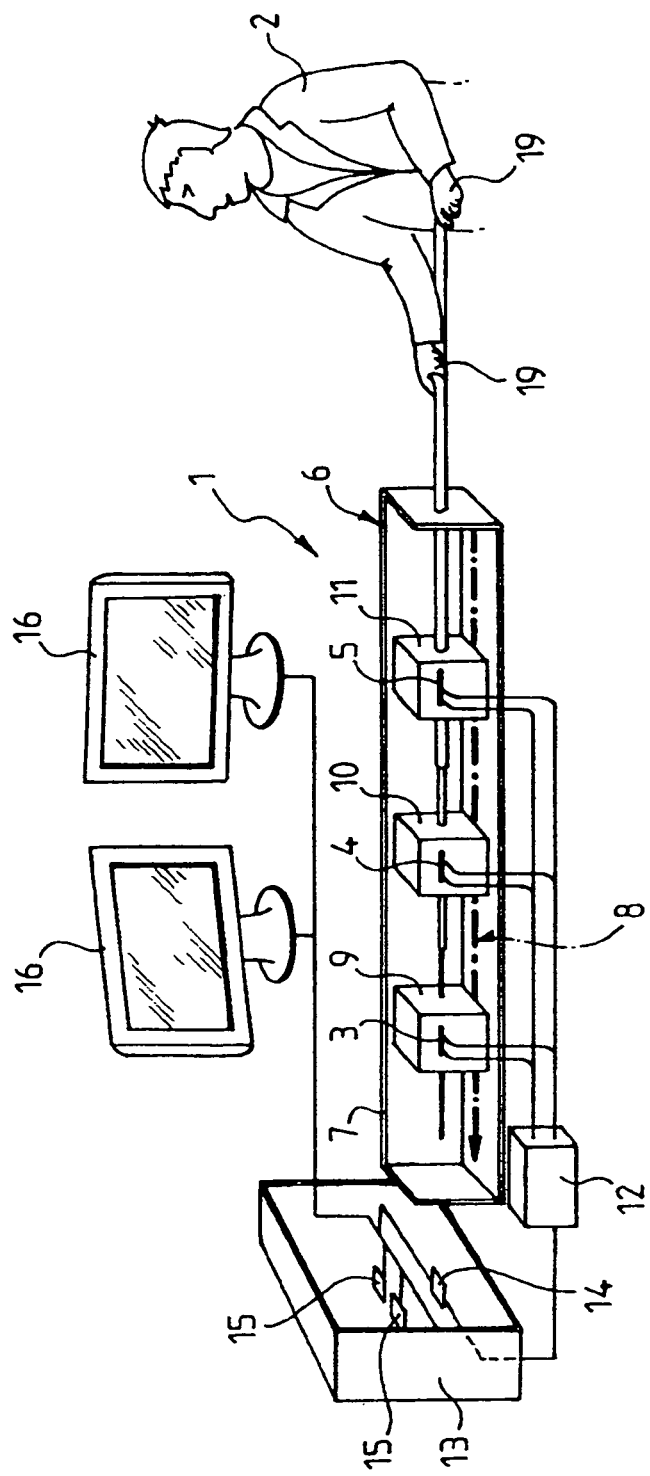
FIG. 1 is a simplified diagram providing a perspective of an overview of a system according to an embodiment of the invention.

FIG. 1 shows a system 1 for simulating a manual interventional operation by a user 2 on a simulated body which could be materialized by a manikin (not represented), with three real instruments 3, 4, 5 such as for instance a guide wire, a catheter and a sheath, comprising a device 6 having a protecting casing 7, a longitudinal track 8, three movable identical carriages 9, 10, 11 along said track, each arranged for securing a corresponding instrument.

Each carriage is respectively connected to an interface box 12 connected to a computer 13 having a processing unit 14, storing memories 15 and a set of two visual screens 16.

Figure 2:
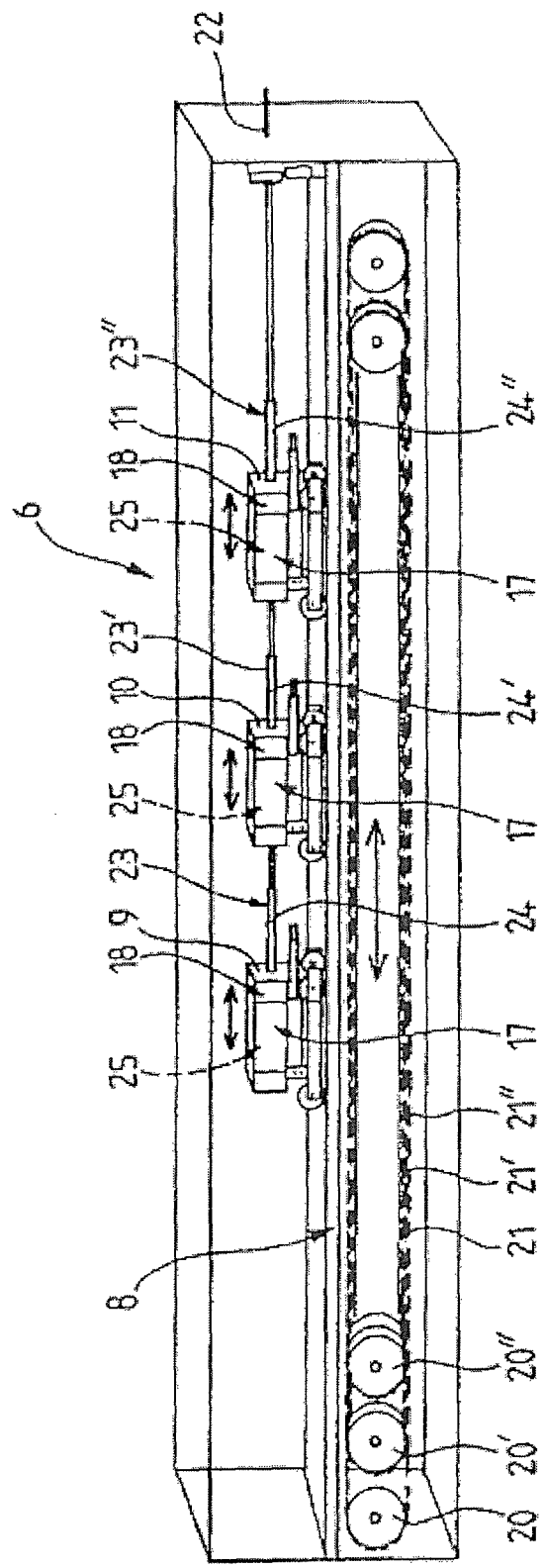
FIG. 2 is a lateral cross sectional view in perspective of the movement guide of the embodiment of FIG. 1.

FIG. 2 shows more precisely in cross section and perspective the device 6 comprising the three carriages 9, 10, 11 having the same functionalities and which are similar or identical in the present embodiment.

Each carriage comprises detecting means 17, for instance optical captors, for recognizing the presence of real instrument 3, 4, 5 to be fitted in, such as an endoscope, a catheter, etc.

It also comprises feedback means 18, known per se, for receiving and transmitting to the user hands 19 (see FIG. 1) a feedback force from said real instrument with respect to the movement of the hand and of the simulation procedure stored in the memories 15 of the computer. Such feed back means are formed, for example is the following manner.

First, it is observed that the locking system is situated on a feedback control system member, held on by two metal leaves allowing feedback working in pulling and pushing.

Finding the relation between the user's force applied on the locked tool and feedback control system member response is the problem to be solved.

Here, the feedback control system member response depends on the leaves' deformation, caused by the force applied on the locked tool. The deformation of the leaves has to determine a feedback control system member response so that the users feel a real tactile-feedback.

The amount of leaves' deformation is proportional to the force applied by the user and has to be detected to be used in determining the feedback-response.

It was therefore applied, on one of the leaves, a gage to detect the amount of deformation, by measuring the change of its resistance. From the tests made on the managing tool dedicated elements (tool wagon), the range of the force applied on the locked tool was about ±3 Newton and provided an electronic signal which is amplified.

The amplified signal is then sent to the electronic case that facilitates or contrasts the managing tool dedicated elements (tool wagon) movement, using a motor.

The output voltage change is at least 10 mV with a voltage supply of ±2.5 V to be processed by the instrumentation amplifier.

The leaves' thickness is chosen considering an excursion of the feedback control system member of maximum ±0.3 mm and considering a minimum leaves' thickness that couldn't permanently be deformed by the applied force.

The measurement tests have been implemented using a strain indicator and recorder and a 3D control system:
First test session: Extensometer mounted on harmonic steel leaf, thickness 0.3 mm and the other leaf with same thickness (Fig. J-4).
Second test session: Extensometer mounted on harmonic steel leaf, thickness 0.2 mm and the other leaf with same thickness (Fig. J-5).
Third test session: The 0.4 and 0.5 mm leaves are too much rigid.

Finally it appears that using as support the 0.3 mm leaf, the system can be prevented from abrupt movements so that the feedback control system member does not go in collision with the mechanics fixed (cones of entrance and exit cones).

For the conversion factor $\mu\epsilon/\epsilon$->mV/V, a 350Ω full-bridge extensometer has been selected.

The core of the feedback control system is a deformation transducer that measures the deformation of an extensometer known per se for instance a transducer manufactured by the firm VISHAY or equivalent sited on one of the metal leaves changing output voltage. It was considered an open-faced constantan foil gages with a thin, laminated, polyimide-film backing. This gage is recommended for use in precision transducers and characterized by low and repeatable creep performance.

Also recommended for stress analysis applications employing large gage patterns, where the especially flat matrix eases gage installation.

Figure 7:
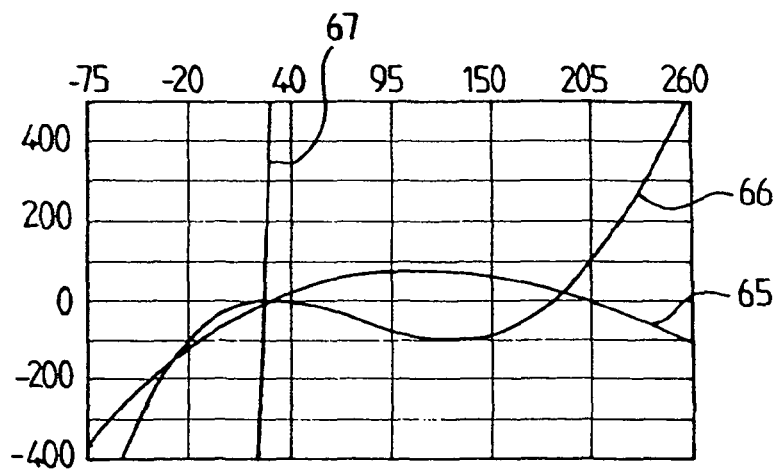
FIG. 7 is a temperature diagram showing the appropriate thermal expansion of an example of structural material on which a gage is to be used for measuring feedback strains.

The extensometer used is a compact full-bridge pattern for use on small, double-bending beams, axial grid centerline spacing 0.250 in (6.35 mm), resistance in Ω is 350±0.2% and gage self-temperature compensation, the approximate thermal expansion coefficient in ppm/° F. of the structural material on which the gage is to be used, follow the characteristics shown on FIG. 7, where K-Allay (curb 65), A-Allay (curb 66) and D-Allay (curb 67) evaluate according to said curbs, with absciss in O and Thermal output in ue along the Y axis.

It is observed therefore that deformation is proportional to the force impressed to the locked tool.

Transducer's output voltage being used to control motors that, according to the impressed force, help the independent dedicated system's movement.

An example of tables which could be used with the invention is provided hereafter.

TABLE 1

| Force (N) | $T_+(\mu\epsilon/\epsilon)$ | $T_-(\mu\epsilon/\epsilon)$ |
|---|---|---|
| 3 | 1095 (0.20 mm) | 1080 (0.18 mm) |
| 2.5 | 920 | 890 |
| 2.0 | 730 | 670 |
| 1.5 | 530 | 530 |
| 1.0 | 385 | 345 |
| 0.5 | 185 | 180 |

TABLE 2

| Force (N) | $T_+(\mu\epsilon/\epsilon)$ | $T_-(\mu\epsilon/\epsilon)$ |
|---|---|---|
| 3 | 2340 (0.6 mm) | 2290 (0.57 mm) |
| 2.5 | 2120 | 1900 |
| 2.0 | 1660 | 1530 |
| 1.5 | 1250 | 1200 |
| 1.0 | 860 | 830 |
| 0.5 | 460 | 450 |

The feedback of the device is for example obtained through an electronic card with two custom programmed pic of the series 16f876.

Here three control signals have been withdrawn from the electronic board: direction control, PWM-out, motor enable. The signals are sent to the 16f876 pic and managed by a feedback software of the type as follows (in picbasis).

The software loaded on the 16f876 pic waits for the activation data of the feedback status sent by the PC. In these data there is the value of the gain constant of the derivative integrative proportional system that the feedback implements. When the data string is sent, a local retro-action starts. The local retro-action takes the digital value of the extensimeter—opportunely converted by the analogical digital converter of the pic 16f876—as reference signal. The relation implemented in the algorithm that manages the retroaction is:

$$x=(a-b)*c$$

with:
a: initial value of the strain gage;
b: it is the current value of the strain gage;
c: the value of the gain constant;
x: pic output (pin C1) that it is a PWM value that interacts on the motor's drivers to send command to the motor.

Attached A

```
Include "modedefs.bas"
    DEFINE OSC 20
    DEFINE HSER_CLROERR 1 ' SR reset of the USART
    DEFINE HSER_RCSTA 90h
    DEFINE HSER_TXSTA 24h
    DEFINE HSER_SPBRG 0Ah
    'sampling time
    DEFINE ADC_SAMPLEUS 50
    DEFINE ADC_BITS 8
    DEFINE ADC_CLOCK 3
    'output port settino of the PWM signal
    'portc.2
    DEFINE CCP1_REG PORTC
    B0        var byte
    INSTAT    var byte
    Num       var byte
    Konst     var byte
    ValueFeed var word
    ADCON0 = 00000001
        ADCON1 = 00001110
    TRISA = 255
    TRISB = %11000000
START:
    PORTB.2 = 0 'DIRECTION CONTROL
    PORTC.2 = 0 'PWM OUT
    PORTB.4 = 0 'ENABLE MOTOR
    PORTB.5 = 1 'LED MONITOR
        'POTRTB.0 E PORTB.1 DIP SWITCH SETTAGGIO
    IF (PortB.0=0 AND PortB.1=0) THEN
        Num=1
    ELSE
        IF ( PortB.0=1 AND PortB.1=0) THEN
            Num=4
        ELSE
            Num=9
        ENDIF
    ENDIF
    PAUSE 4000
    ADCIN 0,INSTAT
    PORTB.5 = 0 ' END INIZIALIZZATION
    B0=170
WAIT:
    HSERIN [B0] 'HEX AA
    IF (B0 = 170) THEN
        HSERIN [B0]
        IF (B0 = Num ) THEN
            GOTO Verifica
        ELSE
            GOTO PWMREG
        ENDIF
    ELSE
        GOTO WAIT
    ENDIF
Verify:
    HSERIN [B0]
    IF (B0 = 39) THEN' Hex 27
        HSERIN [Konst ]
        PORTB.5 = 1
        PORTB.4 = 1
        GOTO PWMREG
    ELSE
        IF(B0 = 23) THEN 'Hex 17
            Konst = 0
            PORTB.4 = 0
            PORTB.5 = 0
        ENDIF
        GOTO WAIT
    ENDIF
PWMREG:
    ADCIN 0,B0
    ValueFeed = (Konst * (ABS( B0 – INSTAT)))/16
    IF ( B0 > INSTAT )THEN
```

```
        PORTB.2 = 1 'inverse
    ELSE
        PORTB.2 = 0
    ENDIF
    IF(ValueFeed<255) THEN
        HPWM 1,ValueFeed.BYTE0 ,15000
    else
        HPWM 1,255,15000
    ENDIF
    GOTO WAIT
END
```

The device 1 (see FIG. 2) further comprises motors 20, 20', 20" and transmission belts 21, 21', 21" for having the carriages moving on track 8, an entry 22 for introducing the elongated instruments in the device, and interconnecting elements 23, 23', 23", for instance in the form of telescopic pipes 24, 24', 24", for interconnecting the carriages and letting the elongated instruments go through freely.

As shown on FIG. 1 each carriage is connected to the interface box 12.

According to the embodiment of the invention more particularly described here, each carriages further comprises clamping means 25 which shall now be more precisely described in reference to FIGS. 3 and 4.

Clamping means 25 provide a locking and rotating system which does not use motors.

Opening and closing the clamp happen through electromagnets that are activated when the tool or elongated instrument is recognized by the detecting means 17.

The clamping means comprise two elements 26 (see FIGS. 3A-3E) and 27 (see FIGS. 4A-4D) (i.e. first electromagnetic means 26 and second electromagnetic means 27).

Figure 3A:
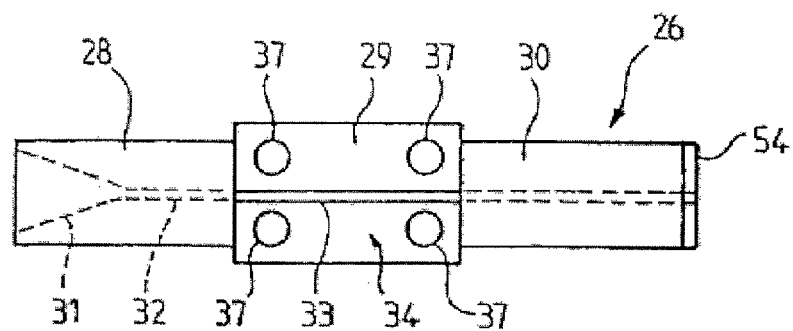
FIGS. 3A to 3E are views which show the female part of the clamping means according to the embodiment of the invention more particularly described therein.
Figure 3B:
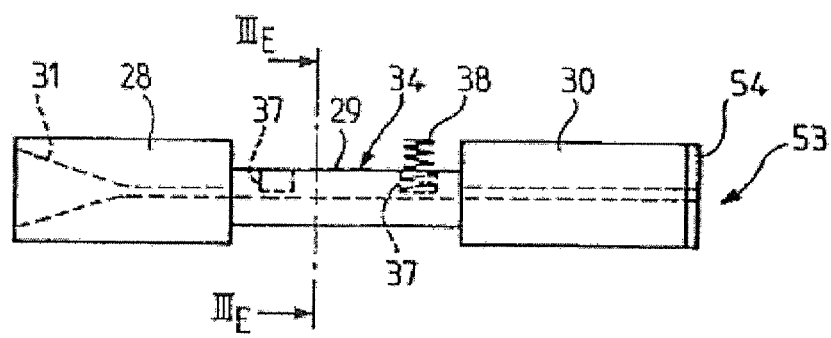
Figure 3C:
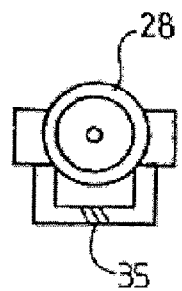
Figure 3D:
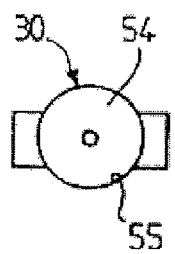
Figure 3E:
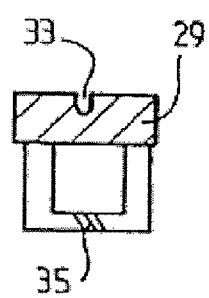

Elements 26 is shown on FIGS. 3A-3E. More precisely FIG. 3A is a top view, FIG. 3B a side view, FIG. 3C a front view and FIG. 3D a bottom view of element 26. FIG. 3E is a cross section according to $III_E$-$III_E$ of FIG. 3B.

In view of the figures, it appears that element 26 comprises three parts integrally connected together 28, 29, 30. A first part 28 which is cylindrical and comprises a funnel or conical hollow entry 31 that authorises a perfect insertion of the guide of the tool (not represented) by progressive guiding into an axial cylindrical channel 32 provided inside said part in the prolongation of such conical entry.

The second part 29 or central part is integrally connected to the first part. It is parallelepipedic and arranged to cooperate with the second element 27.

Such part includes a central and axial prolongation 33 of channel 32, which is half cylindrical on its inferior part and opened on its superior part such as the part 29 presents a plane interconnecting superior surface 34 with second element 27.

Part 29 is made of magnetic material to form, when activated by adjacent wrapping coil 35 for instance fixed on a plastic U shape portion attached on the external inferior face of said part 29, (see FIG. 3C) the negative pole of the electromagnet clamping of the preferred embodiment of the invention described herewith.

The wrapping coils 35 are provided in a manner which will be described hereafter.

The superior face 34 has four cylindrical hollow cavities 37 disposed at each of the rectangle corners and containing heloicodal springs 38.

Finally element 26 is terminated by the third and end part 30 also cylindrical, symmetric of first part 28 with regard to second part 29.

Figure 4A:
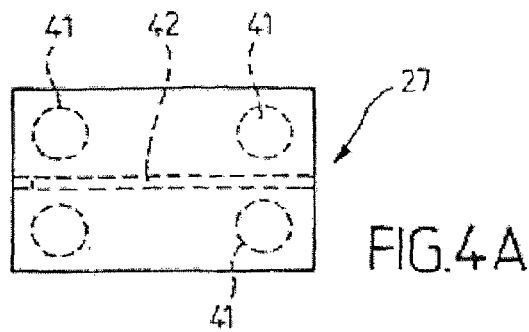
FIG. 4A to 4E are views of the male part of the clamping means of FIG. 3.
Figure 4B:
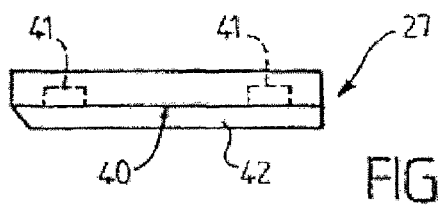

FIGS. 4A-4D show details on element 27. More particularly FIG. 4A is a top view, FIG. 4B a side view and FIG. 4C a front view of element 27.

Figure 4C:
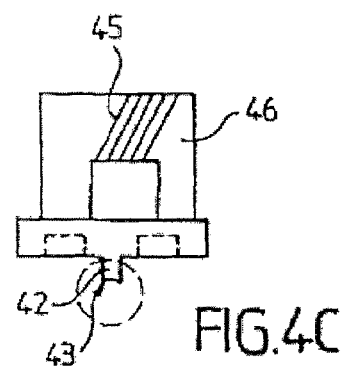
Figure 4E:
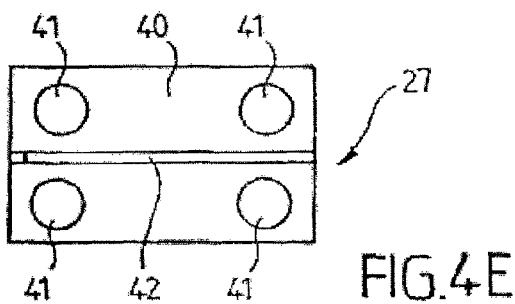
Figure 4D:
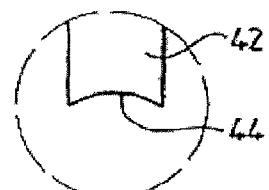

FIG. 4D shows a detail of FIG. 4C on the edge of the protruding part of element 27.

Referring to these figures, element 27 is formed of magnetic material such as ferromagnetic iron to constitute the positive pole of the electromagnet to be obtained.

More particularly element 27 is a parallelepipedic bloc of the same lateral and longitudinal dimensions or slightly smaller than second part 29 of element 26, so to slidably fit between lateral facing sides 39 respectively of parts 28 and 30.

It has a plane inferior face 40 arranged to cooperate with plane superior face 34 of element 26, and comprises four corresponding hollow cavities 41 identical to holes 37 for containing the other extremities of springs 38, such as, without any pressure between element 27 and part 29 the springs maintain at distance their respective superior and inferior surface.

Element 27 further comprises a protruding longitudinal arrest or shelf 42 arranged to penetrate and slidably match with half cylindrical channel prolongation 33. This arrest presents on its longitudinal periphery summit or edge 43, a concave cylindrical wall 44 (see FIG. 4D), to shapily cooperate with the elongated tool (not represented).

An adjacent coil 45, for instance fixed on a plastic U shape portion 46 attached on the external superior face of element 27, is provided.

When current comes inside coils 35 and 45 associated to the magnetic elements, the magnetic parts 29 and 27 are attracted and they concur to grip the tool between the cylindrical wall of channel 33 provided inside element 27 and concave wall 44 of shelf 42 of element 27.

Therefore the dimension of the diameter of channel 33 in the clamp system changes automatically, depending on the tool used with the clamp system.

Furthermore, the force, with which the clamp is created can vary and change as instructed by the computer, as it depends on the current supplied to the magnetic system which is easily regulated in a manner known per se.

When the two magnetic parts are attracted they become loyal to the inserted tool and all the system, the clamp system and the tool, can then rotate together.

In the embodiment of the invention more particularly described the coils are provided within a system which both allows magnetic activation while authorizing a perfect and smooth rotation of the whole system along the axis of the carriages.

Figure 5:
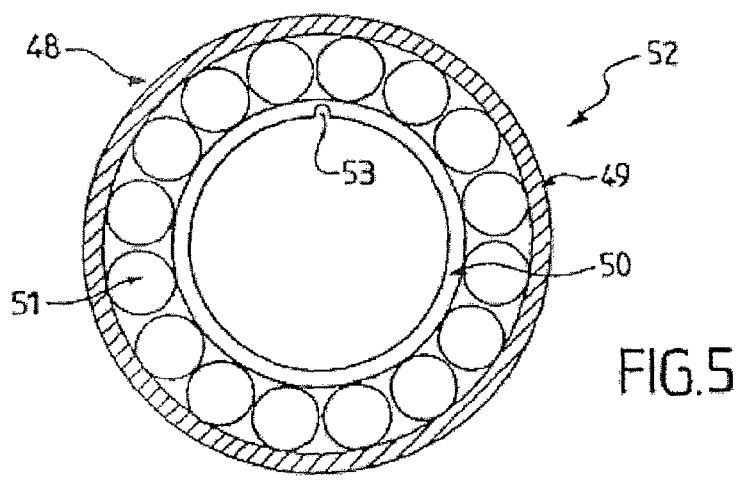
FIG. 5 shows a cross-cut of the ballbearings used with the clamping means of FIGS. 3 and 4.

For this purpose (see FIG. 5) two plastic cages 48 with two cylindrical walls 49, 50, in which balls 51 are inserted, are provided to form two ballbearings 52.

The clamp per se i.e. elements 26 and 27, heart of the locking system, is inserted within these two bearings as it will be further described here after.

On their part, coils are formed by solenoid with very thin windings of copper. The two elements are on their side realized in ultralight metallic material.

In the embodiment more particularly described here it is further emphasized that element 26 is a unique block, with shape substantially of a cylinder on its end parts (28 and 30), and in which the center zone 29 has increased dimensions for the connection with solenoid 35.

Elements 27 is on its part, traversed from its beginning to its end by channel 32-33, whose diameter depends on the maximum dimension of the tools that the clamp will have to block.

As already seen above a cone shape is provided at the entrance of element 26 in order to guide the inserted tool into the channel 32. In the center zone, channel 33 has then the same diameter than channel 32 when no activation of the clamp is performed.

The two cylindrical parts 28 and 30 (of enter and exit of the tool) are on their part, covered, on their internal surface, by an oxidating layer that isolates them electrically from the magnetic action coming from the solenoid.

At the exit 53 (see FIG. 3B) of the third part 30 of element 26, on the outside of the lateral external wall, there is a disc 54, interlocked and concentric to the cylinder, with a hole circular 55 sector. On the corresponding carriage on which the external wall of cage 48 is affixed, there is an optical encoder, arranged to recognize the spin of the hole circular sector 55 disc.

As indicated earlier, element 27 is also made by a unique block, with a parallelepipedic shape provided with a protruding longitudinal arrest 42 of the same length than the whole element 27 and with a smaller width than the diameter of the channel 32 of element 26. The depth and shape section of such arrest on their part, are designated according to the locking of the different kinds of tools.

The two cylindrical enter and exit parts 28 and 30 are inserted in the two ball bearings 52 and fixed in the internal walls 50 of the cages, so that the entire block of the clamp can rotate about the axis of the channel 32. In the two inner metal rings of the ball bearings there are two circular holes 53, one for each metal ring, in order to host an electrical contact.

The electrical contact created on the income wall is connected with the windings of the solenoid 35 interlocked to element 26, while the one on the exit wall with the windings of the solenoid 45 is interlocked to element 27.

The external metal rings of the bearings are fixed to the corresponding walls, and are electrically connected with the walls, and also with the inner metal rings, through the spheres of the bearing.

The cage is itself interlocked to the plain base (not represented) of the corresponding carriage which has the possibility to move along the axis of the channel 32 within the casing 7.

The way the clamping means and their installation is provided will now be further described.

Elements 26 and 27 are joined together through four springs, placed in the holes 37 and 41 of the central zone.

The arrest 42 of element 27 is inserted in the channel 32 of element 26, in order to guide the movement of element 27 in orthogonal direction to the axis of holes 37 and 41.

When an elongated tool is entering part of element 26, the cone 31 forces the tool to enter the channel 32.

In rest state, i.e. when the tool still has not been recognized from the Presence System, element 27 has a height, regarding to the plane of the channel, such to allow to have a continuation of the channel also in the center zone.

The tool therefore can continue in its way without obstacles, until catching up the escape cylinder of element 26 and passing through.

When the tool catches up the presence system, sited after the exit wall, the electromagnetic operation of the clamp is activated, as described hereafter.

The activation of the presence sensor makes the electronic circuit of solenoids' control transmit an electrical impulse, and then provides a current in the solenoids' windings.

In the windings of the solenoid 35 loyal with element 26, the current flows in clockwise director, while in the windings of the solenoid 45 interlocked to element 27, the current flows in counter-clockwise direction.

In this way two magnetic fields with opposite polarity are created, so that they are attracted: the intensity of the impulse is such as to exceed the elastic force of the four springs, and element 27, guided through the inside part of the channel, is pushed towards element 26.

Therefore the channel's diameter in the center zone is decreased, until touching and locking the inserted tool.

At this point the electrical impulse is interrupted, and a lower continuous current flow is generated with a value high enough to hold tight the two parts of the clamp. The friction between tool and the narrow channel is such to allow the user who has inserted the tool to move the tool itself in the requested ways, along the axis of the channel (longitudinal axis), with consequent cage's movement.

The movement of the cage is then captured from a sensor (not shown) (reluctance transducer), connected to a motor.

The variation of the sensor's output induces a spin in the axis of the motor, that enhances or impedes the movement of the global system (managing tool dedicated element), generating a tactile feedback sent to the customer.

In spin or rotation the spin impressed by the user is captured from an optical encoder (not shown), through the capture of the spin of disc 54, loyal to element 26, sited after the exit wall.

The encoder, activated from the tool presence sensor, captures the clamp's spin through the disc field's spin (via indicator 55), and transmits this value to the computer 13 (PC).

When the global system (managing tool dedicated element) catches up its zero (start) position, an electrical signal is sent to the solenoids' electronic control circuit. Therefore the current flow in the solenoids' windings is interrupted, thus eliminating the magnetic attraction force between element 26 and 27.

When the magnetic force disappears, the elastic force of the four springs 38 makes element 27 to go away from element 26, towards the rest situation, and makes the channel 33 in the center zone increase, eliminating contact and forces of friction with the tool. The user can then remove the tool easily.

With such a new and inventive locking system the dimensions and the weight are considerably reduced.

The single clamp has a total weight near 50 grams, and a maximum dimensions of the order of 40 millimeter in length and 20 of diameter.

This is of remarkable importance, because it allows to reduce the dimensions of the devices connected to the clamp, as they have to deal with a lighter and smaller locking system.

It allows to develop a device that can simulate more than three tools inserted at the same time, and consequently to simulate last generation interventional techniques, respecting the real man's dimensions.

Moreover this locking system or clamping means allows the insertion of guidewires with a dimension's range of the diameter bigger than with the previous locking systems, because the electrical impulse, setting in action the attraction magnetic field, makes the two elements of the clamp come close until touching the inserted probe: thus it is independent from its diameter.

With such advantages of precision and accuracy with the new clamping system, new results can be obtained in simulation which authorizes development on the method as follows.

Figure 6:
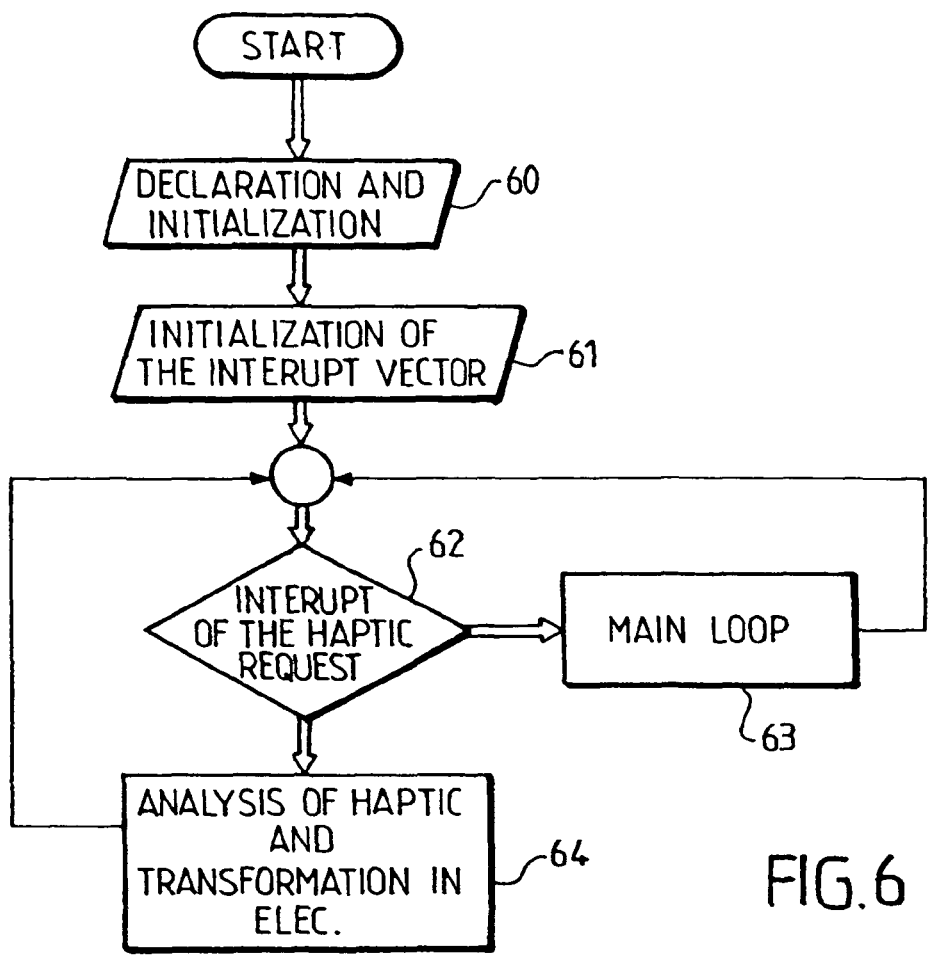
FIG. 6 is a flow chart of a program (haptic software) used with the system and process of the invention.

It is hereafter described in reference to FIG. 6, the program of carts or carriers management (haptic program).

This process is divided in two parts.

The first part, high-level software, is developed in visual C. It resides in the computer host and deals to transfer and to manage the data coming from the sensors toward the software of visualization.

The second part is a program developed with low-level languages, loaded in the microcontrollers present in the electronic cards sited next to the carts.

As it regards this low-level language, it is divided in two parts related to the nature of the sensors on the cart. The first section manages sensors that capture the presence of the catheter inside the clamp, the second section manages the strengths of retroaction that the motors have to apply on the cart when some strengths of movement are acting on the chart itself.

The sensors and the transducer on the cart are:
- a couple electro-optics, that captures the presence of the catheter;
- an electromagnetic transducer, that has the function to lock the catheter;
- an optic encoder, that detects the rotation of the catheter;
- an interrupter of end run;
- a force transducer, that measures the longitudinal strengths that act on the cart;
- the optic encoder, integral to the motor traction's rotor of the cart.

The algorithm of the first section follows the firmware structure and the planned chain of measure.

The cyclical footsteps of the program have the function of acquiring the output values of the sensors, of transferring these information to the haptic program, of receiving commands from the haptic program and to turn these commands into physical operations performed by the transducer.

More particularly, a detailed description of the algorithm of this section of the program is provided in reference to FIG. 6.

After the phase of variables' declaration and initialisation (60) an initialisation (61) of the interrupt vector providing that, when the instrument vector is activated, it allows the microcontroller to listen to demands and incomings haptic's program instruction, is performed then the program cyclically reads the electro-optic sensor, that has the function to detect the presence of the catheter. When the catheter's presence is detected, the program manages to close the electromagnetic clamps (step 62), sending the command of closing to a high tension driver. In the main cycle, the program reads constantly the value of the encoder, that monitors the rotation of the clamp around its own axis, and the electro-optic sensor, whose value is transformed by the analogical/digital converter of the microcontroller in a digital word: this digital word can be sent by request to the haptic program.

In other words, it is provided a main loop (63) to read the encoder value to control the clamper's angular position and to read the A/D converter value that transforms the electro-optic sensor's value in a logic word.

The program's request is made by sending to the microcontroller the pre-planned sequences of characters that the device is able to interpret. The program haptic, receiving an answer to the sent command, knows that the microcontroller has received correctly the command and that has performed it.

This part of the program is loaded in the microcontroller, that is a Microchip 16f876. If there is no interruption of the haptic program's data request or close of the clamps, then there is a routine analysis (step 64) of the haptic's program's commands and request and values of the sensors are sent on demand transforming the closure clamp command in electrical signal. The interrupt generally by tools insertion involves the routine too.

For launching the principal software executable file, in order to implement the process having the different features of the embodiment of the invention more particularly described here, a first java interface is loaded and allows to select the type of procedure and to choose one of the available cases.

In each case there is a description of the patient history.

Once the case has been selected the following applications are loaded:
- graphic motor that manages the fluoroscopy visualization control of the electric connection and the state of the hardware: if the hardware is not correctly connected or all the electronic cards dedicated to data signals transfer are not detected, some error messages are produced and the interface loading is interrupted
- initialization of the apparatus: the carriages are moved to their zero initial position and a test on the opening and closing electromagnetic block system is performed
- if the control of the electric connection and the state of the hardware have had positive result, the graphical user interface is loaded and it is possible to select the devices and to check the projections of the fluoroscope and the movement of the table of the patient,
- generation of the ecg of the patient The graphical user interface introduces on its part a list of the available devices classified by functionality and associated to a carriage.

The selection of a device activates the sensors dedicated to this type of device recognition.

When the device introduced by the user reaches the detection system on the dedicated carriage, a signal is sent to the haptic interface that activates the locking system related to that carriage and have the device locked to the carriage.

The position of the device, and therefore of the carriage, is connected to the motor's encoder which provides a value used to manage the movement and the feedback of the carriages. Such value is brought to zero in the phase of the apparatus' initialization and is updated 20 Hz.

An active cart movement determines a variation of the corresponding encoder value. Such variation is detected by the haptic interface that update the positions of all the following carriages, not yet activated, maintaining the distance between them constant.

The values of the encoders are sent to the high-level software that manage the devices visualization.

The system is provided with additional peripheral:
- a syringe for the contrast liquid; the syringe is connected to a flow sensor that detects the quantity of air injected by the user transforming it into an electric signal that through the haptic interface is sent to the high-level software that elaborates it and visualizes the effects of it by the graphic motor
- the indeflator; it is connected to a sensor that detects the pressure practiced by the user and turns this information into an electric signal that through the haptic interface is sent to the high-level software that elaborates it and visualizes the effects of it by the graphic motor
- Pedals: the pressure of the first pedal sends an activation/deactivation signal of the fluoroscopy to the high-level software through haptic interface; the pressure of the second pedal sends through the haptic interface a signal that activates fluoroscopy image or movie capture in the high-level software.

Therefore the user is able to practice easily and with a great impression of reality an operation which is simulated in real time, with very efficient and accurate pedagogical results.

With a first embodiment of the method of the invention as it can be ameliorated due to the use of a quasi perfect clamping system, a mesh structure is used for modelling the body of a patient.

A mesh is a geometric structure of flat or curve surfaces composed of adjacent polygons.

Shape and dimension of the polygons are variable, therefore the mesh can easily represent both flat surfaces (a little number of big polygons) and curves surfaces (a big number of little polygons).

The geometric structure of the mesh is then introduced in the system of physical simulation and can simulates the entire human vascular system.

In fact, the geometric model of the surfaces can be widened with physical property such as the elasticity allowing to simulate the vascular system deformation due to blood pressure, collision with an operating device or expansion produced during the cure of the stenosis, which will authorize a much more realistic simulation.

More precisely an embodiment of the method of simulation used with the invention provides use of algorithms which authorizes correctly the tree-structure of the vascular system and/or the arterial and the venous one together with the mesh technic.

Differently from the prior-art which took advantage of pre-calculated stenosis' models, it doesn't exist pre-calculated lesions in the method of the invention which provide lesions belonging to the same one mesh of the constructed anatomies.

A more greater freedom in modeling stenosis assigning anatomical shapes and articulated physical property is then surprisingly obtained.

A possible algorithm for this mesh structure use in simulation is provided hereafter.

//* It is calculated the pressure that the device expresses on the tissue taking into account the inducible of the tissue and the characteristics of the stenosis (shape, extension, hardness). This value of pressure is used in order to modify the points of the mesh and in order to adapt the device to the shape of the vase in real time

```
FOR (AllTrianglesOfVesselMesh)
IF (Collide(Triangle, Balloon))
{
    //* The direction of the mesh expansion is estimated for every triangle
    Direction=CalculateDirection(Triangle)
    Triangle.x = Triangle.x+Pressure*Direction.x
Triangle.y = Triangle.y+Pressure*Direction.y
Triangle.z = Triangle.z+Pressure*Direction.z
```

It is remarked that the flexibility of this kind of modelling system allows to perform different anatomical shapes according to what happens in nature.

For hemodinamists, interventional radiologists and cardiologists, it is a normal situation that blood vessels shapes change for different patients.

Therefore the possibility to create different anatomical shapes allows to be able to offer different simulation sessions that are didactically more effective.

It is then possible, with the present method, to study the deformability, resistance and physical behaviour of the organs and tissues, due to a more flexible basic anatomical reconstruction system, which allows to simulate more clinical cases and more different anatomical shapes.

With the mesh structure, complications can be better dealed with.

Furthermore, in real life spams and dissections can occur during a less-invasive hemodinamic intervention.

A spasm is a contraction of an artery with a consequent reduction of the blood flow, which can determine a cardiac frequency variation, high or low, and can change the ECG waveform display.

A total or partial occlusion of the artery with a device can determine a spasm.

In the simulator of one embodiment of the invention, it is possible to simulate a spasm which is obtained by changing the cardiac heartbeat animation frequency, the ECG waveform and the diffusion of the contrast liquid in the vessel.

Such spasm simulation involves for instance the use of an algorithm as follows:

```
IF (Spasmo)
{
    HeartAnimation(SpasmoHeartRate)
    ECGDiagram(SpasmoHeartRate)
}
```

With the method of another embodiment of the invention as described here, it is taken care of the fact that the walls of the arteries are constituted from three overlapped layers of tissue.

In real practice, a bad manipulation during a procedure or a wrong choice of the tool could damage the vessel.

For example the tip of the device can tear one or all of the tissue's layer and pass through them instead of going through the vessel.

The doctor in this case finds a greater resistance to the advance of the device.

In the simulator of this embodiment of the invention the dissection is realized showing the device in its position coinciding with the wall of the vase and giving back a tactile feedback adapting continuously to the performing of the dissection.

It is here emphasized the progress it involves in comparison with the prior art and the importance of such possibilities in medical procedures.

Spasm is a suffering state of the patient and must immediately be identified by hemodinamist so that he can proceed to the opportune procedures.

Dissection is also a serious complication because of the risk to perfore the artery.

However if spasm and dissection happen during a less-invasive intervention, the procedure must be continued by the vascular surgeon.

In the simulator the spasm is reflected in altered cardiac heartbeat animation frequency, abnormal ECG waveform and less smooth dispersion of the contrast liquid in the vessel An other point has been improved in the embodiment of the invention more particularly described therein.

It is due to the fact that vascular system can be assimilated to an hydraulic net, which contains a fluid moved by a pump (the heart). A mathematical model of contrast fluid's diffusion has here been developed, allowing the fluid to be injected in whichever point of the net.

The model is arranged so that the course of the pressure caused by the hearth can be freely modelled, making possible and easy the simulation of different anatomies, pathological and physiological conditions.

The model considers the sections of all the veins interested by the blood stream, the veins' elasticity and the eventual presence of stenosis.

It gives at each moment the value of contrast fluid density in each position of the vascular net, and allows its visualization in the fluoroscopic image, graphing the different colour of blood vessel's surface.

It is therefore possible to regulate the flow rate and the duration of fluid injection as the model captures and memorises the amount of injected contrast fluid.

More precisely the physical model for the contrast liquid is a fluid-dynamics net model, that means that in every moment length and section of the net are known.

The simulation algorithm takes into account different parameters i.e. heart rate, curve of pressure of the cardiac pump (the heart cycle can be appropriately modified), vessel's sections, connections between vessels, length of the vessels, presence of the stenosis and complications.

Contrast liquid density is calculated in real time along all the vascular system therefore automatically authorizing a time evolution of the contrast liquid simulation.

The contrast liquid visualization algorithm consists therefore in a perfect mapping in each fraction of the vessel which could be described as follows.

This algorithm is first based on a contrast fluid library which has the following functionality:
   Management of the human vascular system, with a tree model structure, based on a mono-dimensional approximation of the vessels;
   Simulation of the blood circulation approximated by an equivalent hydraulic-net model and a simplified mechanical model of the heart;
   Simulation of the contrast agent's transport approximated by a transport model of a passive scalar inside the coronary net.

Furthermore, concerning the interface, the API is for instance and here designed to coronography applications and it is structured to allow the following operations:
   Instance of a standard vascular tree dedicated to the systemic circulation, pulmonary and coronary. The vascular tree is simplified to allow the real time simulation;
   Instance of right and left coronary tree is get with a descriptor of the tree structure and the length and radius of every branch. The library transform these information in the physical constants, required by the simulator, using parametrization available in literature;
   Instance of a simplified cardiac model;
   Assignment of stenosis' conditions on coronary vascular net specifying relative position, length and middle radius;
   Assignment of default values for the control parameters of the cardiac rhythm;
   Activation/deactivation of the flow and transport simulator;
   Injection of contrast liquid at the base of a tree coronary vascular net;
   Reading the value of contrast liquid concentration in every point of the coronary vascular trees.

Description of the system's components.

The principal components of the simulator are the followings:
   generator of input signals: in particular, a generator of blood pressure's signal, based on a parameterization of the cardiac behavior;
   simulation of the hemodynamic flow: it deals with a mono-dimensional flow model with assembled parameters;
   simulation of the flow of the liquid contrast.

Generator of input signals.

The input signal for the simulation of the hemodynamic's system is a pressure signal, that is obtained through parameterization of the cardiac behavior.

It is used a simple periodic generator of pressure, obtained through periodic interpolation of a pre-assigned pressure curve.

Simulation of the hemodynamic flow.

The hemodynamic flow inside the vascular system is calculated through a simple assembled parameters model, that considers the various branches of the blood vessels like electric nets, whose parameters depend on the geometric characteristics of the considered branches.

The components that are modelled inside the electric net, equivalent to the vascular system, are the followings:
   the cardiac pump, modelled as an electric scheme, characterized by constant resistances, independent from the volume (except the Cavum Vein and the systemic arteries), from constant viscosity of the blood, and from elastic walls of the vessels
   generic arterial vessel, modelled through a electric parameters-assembled RLC net.

The net parameters are calculated considering the vessel's length and the section, through the following formulas:

$$R = \frac{8\mu l}{\pi r^4}; L = \frac{\rho l}{\pi r^4}; C = \frac{2\pi r^3 l}{Eh};$$

where $\mu$, $\rho$, $E$, $h$ are, respectively, blood viscosity, blood density, the modulus of vessel elasticity and the thickness of the wall, that now is approximated with $h=0.16r$.
   arteries connector, equivalent to a short electric circuit, and used for modelling non binary trees of arteries.
   stroke of terminal artery, equivalent to a RLC net with a load. The RLC parameters are obtained through the length and the radius of the artery as a generic branch of artery, while the load resistance is approximated with a piecewise constant function dependent from the section of the blood vessel.

Contrast liquid transport.

The contrast liquid is modelled as a passive scalar inside blood vessels and it is described as mean concentration in every vessel section. It is a function $c(x,t)$ with $x$ varying from 0 to 1, 0 is the value at the tube head. The evolution of the c is based on the following limited difference equation:

$$c(x, t+1) = c(x, t) - \frac{\Phi \Delta t}{a \Delta x}(c(x, t) - c(x - \Delta x, t)) + \frac{D \Delta t}{\Delta x \Delta x}(c(x + \Delta x, t) + c(x - \Delta x, t) - 2c(x, t))$$

$\Phi$, $a$, $D$ are respectively the entering flow, normal section of the blood vessels and the diffusivity of the passive scalar.

Figure 8:
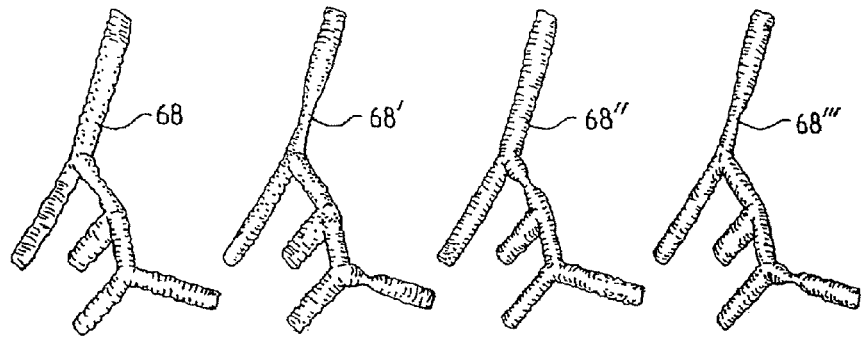
FIG. 8 shows an example of the simulation of the contrast liquid transport inside a simplified model of the vascular tree.

The integral curve that solve the flow and transport equations is a 4th-order adaptive step Runge-Kutta. FIG. 8 shows an example of the simulation of the contrast liquid transport inside several simplified model of the vascular tree 68-68'''.

On the contrary (see here above) the mesh consists of triangles. Due to this specific aspect of the method as described and corresponding to an embodiment of the invention, the calculations are more express.

In other words, for every triangle pertaining to the anatomy mesh, it is pre-calculated the correspondence with the physical model that represents the course of the contrast liquid.

The visualization algorithm then interrogates the physical simulation algorithm of the fluid in order to obtain information concerning fluid density and the liquid percentage with which the triangles, that belong to the mapping of the net representing the fluid-dynamic system, must be coloured.

Here it should be noted that fluid contrast injection is indispensable to the hemodinamists in order to see in the fluoroscopic image the shape of organs crossed by the blood.

The possibility to verify the amount of contrast fluid injected allow the hemodinamist to trust he is practicing a real endovascular procedure.

This is because in a real procedure, the amount of contrast fluid used has to be reduced to minimum, in order to avoid damaging the patient.

One of the other advantage of this simulation is that it renders the simulation incredibly realistic because it considers the effective point of fluid injection without considering pre-calculated outlines, far from the really operating conditions, and because it considers the effective point of fluid injection and does not show a flat black patch that appears within a given outline Furthermore the model takes into account the presence of blood in the vessels and the interactions between two fluids (blood and contrast liquid). For this purpose, the model of the blood pressure, as it flows through the vessels, takes into account: section, elasticity and presence of stenosis, while it captures and memorises the amount of contrast injected fluid.

In an other embodiment of the invention, it is furthermore implemented a fluoroscopy's algorithm, based on NVIDIA technology. This technology, generally used to compute special 3D real-time effects rendering for example industrial research and development as in car and vehicle production was not implemented in the present field for practical reason.

With the algorithm used in one embodiment of the present invention, which involves calculation of the thickness of one or more objects so the overlaps of the objects can be managed working to pixel levels (picture element), it has been possible to use this technology.

The structure of the algorithm allows to modify every object's pixels colour (more real-simulate x-ray crossing several layers having a better image definition).

All computations are managed from GPU Graphics Processor Unit so that CPU (Computer Processor Unit) is involved in the physical simulation obtaining a greater speed in the calculations.

With the invention it is therefore possible to upgrade permanently the result of simulator as it is open to new technologies such as the "floating point blending" which ultimately accelerates the speed of the algorithm due to a less computational complexity of the shaders.

The "floating point blending" develops the realism of the rendering increasing precision from 12-16 bit integer to 16-32 bit floating point.

Furthermore, and as indicated earlier, using NVIDIA technology, the real-time rendering can be offloaded from the CPU to high-performance Graphics Processing Units (GPUs).

This technology reduces programming complexity using a dedicated high-level language for graphics. This method for programming real-time pixel and vertex effects eliminates the need to write applications with extensive low-level assembly code. With built-in abstractions and optimizations, a new graphics programming language can increase the number of applications with cinematic-quality effects.

The Cg programming language used with the programming of the algorithm involved with the invention, provides ease and speed of programming of special effects and accelerates delivery of real-time cinematic-quality graphics experiences.

The visualization applications that take advantage of Cg shader technology get the most realistic visual effects. Cg runtime feature can benefit from the addition of a new GPU when it becomes available without recompiling or upgrading the software.

Furthermore Cg allows for a range of high-fidelity film effects to be efficiently merged into fluoroscopy application and executed in real time such as motion blur and other camera effects and accurate skin, muscles.

An example of implementing algorithm is provided thereafter.

It is here provided a shader realized with the CG that executes the removal of two buffer: FrontBuffer e BackBuffer.

```
//*******************************************
//*                INPUTS STRUCT            *
//*******************************************
struct Inputs{
     float2 Text       : TEXCOORD0;
};
//*******************************************
//*                OUT STRUCT               *
//*******************************************
struct Outputs{
     float4 Color      : COLOR0;
};
//***********  ******************************
//*                FRAGMENT PROGRAM         *
//*******************************************
Outputs main(Inputs IN,
                    uniform float4 DecodeValues,
                    uniform samplerRECT FrontBuffer,
                    uniform samplerRECT BackBuffer)
{
Outputs OUT;
float4 Texture,Texture2;
     Texture=texRECT(FrontBuffer,IN.Text);
     Texture2=texRECT(BackBuffer,IN.Text);
     Texture2 = Texture2-Texture;
     Texture2 = dot(Texture2,DecodeValues);
     OUT.Color=1-Texture2;
     return OUT;
}
```

Computerized visual effects involve the manipulation of display data.

Shaders—the programs and parameters necessary to implement an effect on a set of pixels or vertices-were traditionally written for a specific GPU. The Cg Language provides the constructs for creating platform-independent shaders.

The NVIDIA Cg Compiler works with a C-like language for programming shaders on GPUs. This high-level approach offers also several benefits when compared with assembly-level programming such as simplicity, flexibility, reusability, automatic optimisations and low-level access.

As a runtime compiler, UCA automatically takes advantage of the hardware that is available at the time the shader application is executed.

Application performance is also enhanced because the NVIDIA Cg Compiler includes optimizations for NVIDIA GPUs making it possible to get the best performance out of the hardware without every shader developer learning the intricacies of every platform.

Using specific profiles when writing shaders, developers can easily write for multiple targets. Less capable programmable GPUs can be addressed with separate programs that may not use the full extent of the language, just a subset of its flexibility.

Vertex and pixel shaders are used in multi-pass rendering to generate a measure of the object's thickness at each pixel. The thickness at each pixel is then used to produce the colors of the object on screen.

With the algorithms used with the invention, thickness information is computed each time from the appropriate point of view, and the result is a true volumetric rendering of ordinary polygon objects.

No preprocessing of object data is required, and the result is a volumetric technique suitable for interactive dynamic scenes.

An efficient method which is further described here after, is used to properly render any closed convex or concave mesh as a thick volume and to handle any intersection cases where opaque objects penetrate the volumes to overcome the effects of aliasing in the per-pixel thickness information.

This algorithm can be summarized as follows:

The procedure is divided in three parts:

a) Rasterization of the visible faces of all the present objects in the scene. After this operation in a FrontBuffer data structure that is used from the GPU are stored the sum of all visible faces depths from the actual point of view;

b) Rasterization of the invisible faces. After this operation in a FrontBuffer data structure that is used from the GPU are stored the sum of all invisible faces depths from the actual point of view;

c) Through an abstracting shader is done the difference FrontBuffer—BackBuffer pixel by pixel so that is possible to obtain the information about the objects thickness. This information is use to set the pixel's color It is suitable for volumes of single-scattering material. Material where light arriving at each pixel is the result of only one scattering interaction in the material, thus the total amount of light is a function only of thickness.

As the visible thickness increases, the number of scattering particles increases and so does the probability of scattering. Scattering may both add light and attenuate transmitted light.

The technique for rendering objects as thick volumes start from traditional 3D rendering.

It involves rendering to off-screen render-target textures, rendering depth information as RGBA colors, using vertex shaders and textures to encode information, and using alpha blending to add and subtract high-precision encoded depth information.

One advantage of this technique is that the rendering does not change in order to handle various intersection cases and camera positions.

No extra passes or knowledge about the objects or scene is required as long as the depth complexity of the volume objects remains below a certain adjustable limit.

The depth complexity limit depends on the precision of the thickness information and the number of bits of each color channel used to hold the thickness information. The trade-off between depth complexity and precision can be adjusted from frame to frame. A depth complexity of 16 or 32 volume object faces can be rendered with 15 or 12 bits of depth precision in a single pass.

On hardware that supports blending to floating point render targets, there is no limit to the depth complexity that can be handled.

More particularly, the algorithm for computing thickness considers that the polygonal object is rendered to off-screen render targets using some measure of depth interpolated across the polygons, and that the thickness is computed at each rendered pixel.

At any given pixel, the depths of all of an object's front faces at that pixel are summed as well as the depths of all back faces are summed, the thickness through the object being the back face sum minus the front face sum.

For a given pixel on screen, the thickness through the objects is the sum of the depths of all front faces at that pixel subtracted from the sum of the depths of all back faces at that pixel.

Depth is calculated at each vertex as part of the standard 3D view transform.

Programmable shaders and a few render-to-texture passes, which are known per se, are added to render ordinary polygon objects as thick volumes of light scattering material.

With this technology are obtained high precision values using 8-bit-per-component render targets, objects intersecting handling and occluding any volume object shape, and good eliminating aliasing artifacts.

The approach works for any viewpoint in the scene, and it is then easy to animate the volume geometry.

The technique can be used on the large installed base of Direct3D8 ps. 1.3 hardware.

Using thickness to determine the appearance of objects was not suggested nor taught and did offer exciting new possibilities for real-time interactive rendering. Intuitive controls and color ramps govern the appearance of the volume objects, though more sophisticated treatments of scattering could also be employed.

The fluoroscopy's algorithm being based on NVIDIA technology, there exists an algorithm centralized on the calculation of the thickness of one or more objects, so the overlaps of the objects can be managed working to pixel levels (picture element)

The structure of the algorithm allows to modify every object's pixels colour (more real-simulate x-ray crossing several layers having a better image definition).

A fluoroscopy's colouration algorithm to be used with the invention is for instance as follows:

```
Outputs main(Inputs IN)
{
Outputs OUT;
float4 Texture,Texture2;
01)     Texture=tex2D(FrontBuffer,CurrentPosition);
02)     Texture2=tex2D(BackBuffer,CurrentPosition);
03)     Texture2 = Texture2−Texture;
04)     Texture2 = dot(Texture2,DecodeValues);
05)     OUT.Color=Texture2;
        return OUT;
}
```

This algorithm decodes the buffers' values to obtain the fluoroscopy visualization.

Lines 01 and 02 reads the values stored in the buffers that contain the depth of each pixel of the previous calculated scene's objects.

In line 03 is calculated the thickness of every scene's pixel. The thickness has values comprised between 0 and 1. In the overlapping zone the thickness is near 1.

In line 04 the data are decoded pixels are transformed into the float original format, drawn on the frame buffer and visualised.

The vascular system and its interaction with the introduced devices are physically simulated through shape, elasticity and resistance, as this model allows the physics modelling and the right interaction of each new device.

For example the EPD, a filter that is delivered in the arteries, against the flow of the blood, in order to stop and to collect fragments that were detached from the stenosis.

Another example is the stent of newest generation, with an "Y" shape, that is used in the case of Abdominal Aneurysm Aorta.

The prior-art algorithm allows the expansion of the balloon until it attains the walls of the vase, no ulterior expansion being possible. Such algorithm previewed for balloon an expansion with linear course regarding the pressure.

The algorithm according to the embodiment of the invention more particularly described here authorizes to go further, as it is among other more detailed and takes care of the complexity.

More particularly physical model with which the balloon is represented, consists of n elements independent in their expansion, i.e. provides series of spheres of specific diameters.

Every sphere's expansion is a linear function of the pressure to which it is expanded until the spheres are not in collision with the walls of the vase (mesh).

If there are collisions with the walls of the vase a model of resistance dedicated to the mesh that are interested in the interaction is then considered.

Here, every contact point on the mesh exercises force on the sphere that composes the balloon and every sphere pertaining to the balloon exercises its own force on the mesh.

Accordingly, the expansion is not linear, but is proportionally limited by the resistance exercised between the mesh and the contact points.

Every mesh's point can be regulated with its own rigidity (resistance) and such variable resistance of the points pertaining to the mesh allows a full control on the mesh.

As an example it is possible to create lesions with aspect and rigidity of various structure.

The mesh deformation is on its part based on the pressure exercised from the balloon and at the same time the balloon must continue to expand based on the supplied pressure.

Working on interaction's force between balloon and mesh we have to take into account the possible use of a balloon whose diameter to the nominal pressure may be bigger than the diameter of the vase in which it is inflated, the force with which the balloon interacts with the mesh grows and may break off the vase.

The balloon's visualization is obtained by interpolation of a curve called "spline" that gives good fluoroscopy results.

An example of the relevant model used for balloons operating in pseudo code is provided.

```
FOR(i=1 TO NumBalloonSpheres)
{
//*Physics: The radius of the sphere depends on the pressure exercised between the mesh and the sphere itself. If the central spheres are in collision and the edge sphere are not in collision, the result will be a typical hourglass-shape
    PressureOfSphereBalloon=PressureFunc(BalloonSpheres[i])
    RadiusSphere=CalculateRadius(BalloonSpheres[i],
PressureOfSphereBalloon)
    //*Dati per Rendering
    AllRadius[i]= PressureOfSphereBalloon
    AllCenter[i]= Center(BalloonSpheres[i])
}
//*Rendering
CalculateSpline(AllRadius[ ],AllCenter[ ])
DrawSpline( )
```

The physical model of the stent consists of a metallic mesh. Every node of the metallic mesh is a particle with own physical properties connected to the other nodes according to an established design. The behaviour of every node can be assimilated to a sphere's behaviour.

The spheres that represent the stent are compliant with the associated balloon following its behaviour. If the balloon is expanded until the walls of the vase, then also the nodes that compose the mesh of the stent comply to the walls of the vase.

A self-expandable stent model is close to the standard stent one.

Every node of the metallic mesh is a particle with its own physical properties and it is connected to the other nodes depending on a pre-established design.

When a self-expandable stent is deployed, the spheres that represent the nodes of the mesh are released assuming a speed that depends on their own physical properties and therefore the expansion of the simulated stent according to the invention follows physics of the expansion of a metallic mesh.

The catheter is modelled with a sequence of cylinders interconnected with a two degrees of rotational freedom's joints.

When the cylinders clash with the walls of the mesh, they follow the physical laws with which they have been modelled.

Furthermore, systems spring-damper are applied to the bodies in every joint so that for every joint it is possible to define dumping and stiffness.

A torque is therefore provided for every direction of movement. The force that acts on every joint is a function of the torque force that is a function of the angle and the angular velocity.

The calculation of the elastic force function of the $K e\theta$ angle and the calculation of the viscous force based on the angular velocity $K e\theta'$ are then applied as a torque to the joint in the normal direction to the angle so that it is possible to give physical properties and shape to guides.

In order to simulate the motion of the catheter in a viscous environment forces are applied, that are obtained through an algorithm that works on every single body of the multilink chains, to the catheter.

Such algorithm is as follows:

```
FOR(i=1 TO NumBodies)
{
    Vel=CalcVel(Body[i])
    Force.x=Kdamp*Vel.x
    Force.y=Kdamp*Vel.y
    Force.z=Kdamp*Vel.z
    ApplyForce(Body[i], Force)
}
```

Depending on the real time speed of the body's center of mass, it is calculated Kv and therefore the viscous force. The calculated viscous force is then applied to the body in normal direction to the center of mass.

The algorithm to model the guide wire is such to concur the local management of viscosity and elasticity. The tip of devices is therefore much more ameliorated.

All these new produced devices have specific ways of use and specific fields of application.

Therefore it is extremely important to have the possibility to follow a specific course of formation on specific device.

Interaction between vascular system and the introduced devices physically simulated through shape, elasticity and resistance, the improved interaction between device-anatomy (pressures on the walls of the arteries), device-device (perceive the resistance using two devices) and insertion of guidewire 0.035" before catheter are also better performed.

Smoother balloon dilatation and stent delivery (When a balloon is inflated it is possible to see it expanding little by little and when a stent is deployed it is possible to see its compliance with the vessel's wall) is obtained.

More and more small diameter devices (as new technology evolves), more realistic embolic protection devices, filterwire EZ, are possible to be implemented with such improvements due to a preferred embodiment of the invention.

Technology to realize new devices with their own characteristics and physical properties, such as Carotid Wallstent, NexStent, Picture, Interaction between two different tools is available with the new method of the invention.

In order to render the invention more understandable, concerning its result the following example in the real life can be provided. Here it exists many problems during the interaction between devices that are in an artery at the same time. For example, a balloon that slides along the guide who supports an EPD, cannot cross over a point, situated on the guide, because at the end of the guide a thickening is present.

The hemodinamist perceives this situation as an obviously resistance to the advance of the balloon.

In modelling device as in a preferred embodiment of the invention it has been introduced the possibility to add to the device's physical model the presence of such physical obstacles during the interaction.

Figure 9:
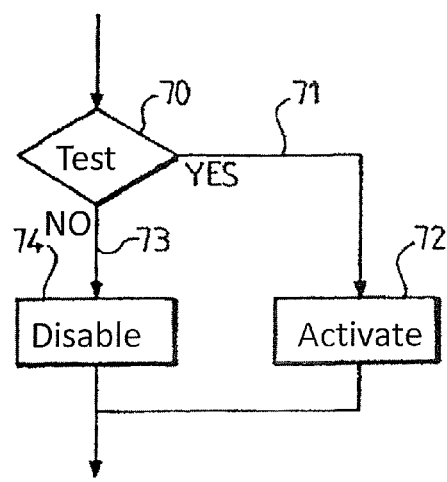
FIG. 9 shows an organigram allowing double feedback.

An algorithm to implement this double feedback could be provided on FIG. 9.

A test 70 is provided to check if Pasiz Balloon>=Pasiz MarkerEpd. If yes (line 71) then the 2° Cart activated block is performed (72). If not (line 73) the 2° Cart Disable Block (74).

Therefore the haptic device gives back to the operator a realistic feedback of the interaction.

The customer perceives the same resistance that he would perceive if he really used two devices.

This effect is obtained varying in real time the advance resistance of the carriages.

The tactile feedback due to the interaction between two tools contributes to increase the realism of the simulation and to increase the didactic power of the simulator.

A simulator monitor visualizes therefore the characteristic curves of the patient's electrocardiogram.

The waveforms are generated from a model that modify them in real time depending on the characteristics of the simulated patient's and depending on the user's actions during the procedure.

The ECG curves algorithm connects the animation of the heart, the curve of the pump cardiac pressure, pertaining to the physical model of the liquid of contrast, and the model of visualization.

The visualization is in real time. The curves are able to represent also the spasm's effects, particular cardiac situations, tachycardia and lowering of the pressure.

Here, it shall be remarked that the ECG is fundamental during angioplasty or angiography procedures because it allows to constantly hold under control the patient's conditions and to correct or suspend the undertaken actions.

According to the algorithms used with the invention, the waveforms are generated from a model that modify them in real time depending on characteristics of the simulated patient during stenting and balloon operations user's actions during the procedure.

The simulation model of the heart and of the vascular system is responsible for performing the visible movement of the heart, performing the visualized waveforms, regulating the spread of the contrast liquid injected.

In the case of complication the simulation model of the heart and of the central vascular system communicates the change to the cardiac heartbeat animation and to the ECG, so that the variations are synchronized to advantages of the simulation's realism.

The simulation model of the heart and of the vascular system is responsible of performing the visible movement of the heart, performing the visualized waveforms, regulating the spread of the contrast liquid injected.

An example of the algorithm used accordingly is provided here after:

//* This pseudocode underline the dependency from the cardiac frequency of the heart animation and the visualization of the ECG
HeartAnimation(NormalHeartRate)
ECGDiagram(NormalHeartRate)

When a complication arrives, like a spasm, the simulation model of the heart and of the central vascular system communicates the change to the cardiac heartbeat animation and to the ECG, so that the variations are synchronized to advantage of the simulation's realism.

A surface model realized with mesh give a simple solution to the anatomies construction based on real patients.

Working on images obtained with various tomography diagnostic techniques it is possible to have the exact anatomical structure of the patient and to simulate the interventional procedure before that it really comes.

Figure 10:
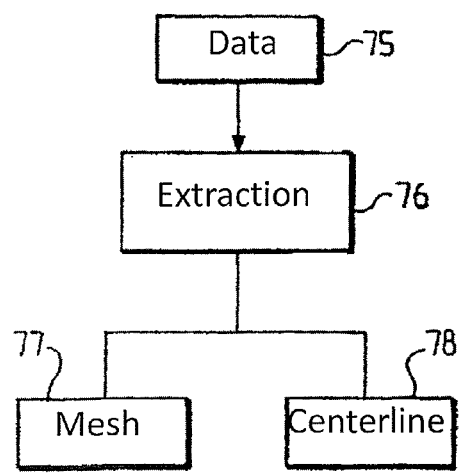
FIG. 10 is an organigram showing the steps to follow in order to simulate the contrast fluid in relation with the veins elasticity.

A possible algorithm for this centration operation is provided in reference to FIG. 10.

Tomography data 75 are provided to instruction concerning information extraction (lengths vessels, radius of vessels, morphology) (76) in order to obtain Mesh Construction 77 and Centerline Construction (78).

The different algorithms provided herewith, written in their corresponding languages, are given in a no limitative way and could be, of course, substituted by algorithms in other languages having the same functionalities.

The invention claimed is:

1. A system for simulating a manual interventional operation by a user on a human or animal body using a simulated body and at least two interventional instruments, the system comprising:
   a longitudinal track,
   a plurality of carriages moveable along said track and configured to rotate and move longitudinally said interventional instruments, each carriage having a clamping device configured to secure one of said interventional instruments to said corresponding carriage, wherein said clamping device comprises:
      a first electro-magnetic device with a hollow part for receiving the one of said interventional instruments to be secured therein, and
      a second electro-magnetic device with a protruding part for pressing at least a part of the one of said interventional instruments within said hollow part while said first and second electromagnetic devices are actuated,
   coils configured to receive electric current to actuate said first and second electro-magnetic devices,
   feedback device configured to receive and transmit to a user hand a feedback force from said interventional instruments with respect to simulation characteristic,
   optical captors configured to recognize the presence of said interventional instruments in each carriage, and
   a computing device configured to:

model an internal system of said simulated body with a mesh geometry comprising a plurality of polygon objects, wherein the plurality of polygon objects model a physical property of elasticity, render interactively in real time the internal system on at least one monitor to provide a realistic visualization of the simulated body and an interaction of the at least two interventional instruments with each other and the simulated body, simulate hemodynamic flow within a vascular system of the internal system, wherein the hemodynamic flow is calculated using a parameters model comprising resistance, inductance, and capacitance (RLC) net parameters calculated through formulas:

$R=8\mu l/\pi r^4$, $L=\rho l/\pi r^4$, and $C=2\pi r^3 l/Eh$, wherein l is a length of a vessel of the vascular system, r is a section of the vessel of the vascular system, μ is blood viscosity, ρ is blood density, E is a modulus of vessel elasticity, and h is a thickness of a wall of the section of the vessel, and simulate deformation within the vascular system caused by at least one of variation in blood pressure, collision of at least one of the at least two interventional instruments with a wall of the internal system, a vascular spasm, or expansion of the vascular system produced during the interventional operation, wherein the computing device is configured to simulate the vascular deformation using the mesh geometry and the modeled physical property of elasticity.

2. The system according to claim 1, wherein the first electro-magnetic device comprises a cylindrical block having a center part for receiving a solenoid and a longitudinal hollow channel for receiving the one of said interventional instruments.

3. The system according to claim 2, wherein said second electro-magnetic device comprises a block having a central protruding part, said block being provided with a central spine arranged to cooperate with the one of said interventional instruments when inserted in the longitudinal hollow channel.

4. The system according to claim 2, wherein the cylindrical block comprises three parts connected together comprising:
a first part which is cylindrical and comprises a funnel or conical hollow element that is configured for insertion of a guide of the one of said interventional instrument by progressive guiding into an axial cylindrical channel provided inside said first part as a prolongation of said funnel or conical hollow element,
a second part integrally connected to the first part, said second part made of magnetic material and configured to cooperate with the second electro-magnetic device, said second part including a central and axial prolongation of said axial cylindrical channel, and
a third part, with a central channel in the axial prolongation of said axial cylindrical channel.

5. The system according to claim 4, further comprising two ball bearings into which are inserted elements for rotation around a central axis.

6. A method of simulating an interventional operation on a human or animal body using a simulated body, a computing device, at least one monitor, and at least two interventional instruments, said method comprising the steps of:

modeling an internal system of said simulated body with a mesh geometry comprising a plurality of polygon objects, wherein the computing device is configured to perform the modeling, and the plurality of polygon objects model a physical property of elasticity;

real-time interactive rendering of the internal system to provide a realistic visualization of the simulated body and an interaction of the at least two interventional instruments with each other and the simulated body, wherein the computing device is configured to perform the rendering on the at least one monitor;

simulating hemodynamic flow within a vascular system of the internal system, wherein the hemodynamic flow is calculated using a parameters model comprising resistance, inductance, and capacitance (RLC) net parameters calculated through formulas:

$R=8\mu l/\pi r^4$, $L=\rho l/\pi r^4$, and $C=2\pi r^3 l/Eh$, wherein l is a length of a vessel of the vascular system, r is a section of the vessel of the vascular system, μ is blood viscosity, ρ is blood density, E is a modulus of vessel elasticity, and h is a thickness of a wall of the section of the vessel; and simulating deformation within the vascular system caused by at least one of variation in blood pressure, collision of at least one of the at least two interventional instruments with a wall of the internal system, a vascular spasm, or expansion of the vascular system produced during the interventional operation, wherein the computing device is configured to simulate the vascular deformation using the mesh geometry and the modeled physical property of elasticity.

7. The method according to claim 6, wherein the vascular spasm is simulated by changing in the modeling and the rendering of the internal system a cardiac heartbeat animation frequency, ECG waveforms, and a diffusion of contrast fluid in a vessel of the simulated body.

8. The method according to claim 7, wherein:
the ECG waveforms are generated from a model that modifies the ECG waveforms in real time depending on characteristics of the simulated body and depending on a user's actions during the interventional operation,
the ECG waveforms are visualized on the at least one monitor and an algorithm is used to visualize in real-time on the at least one monitor an animation of a heart including a curve of cardiac pressure pertaining to a physical model of the diffusion of the contrast fluid, and
the ECG waveforms are configured to represent at least one of the vascular spasm's effects, particular cardiac situations, tachycardia, or a lowering of the blood pressure.

9. The method according to claim 6, further comprising the step of modeling at least one of a contrast fluid diffusion in relation with elasticity of at least one blood vessel in the modeled internal system and a presence of stenosis in at least one blood vessel in the modeled internal system.

10. The method according to claim 6, wherein:
the modeled internal system is a vascular net model,
the method further comprises determining an amount of injected contrast fluid and providing a value of contrast fluid density in each position of the vascular net model, and
the rendering provides a visualization of a fluoroscopic image based on the provided contrast fluid density, and a graphing of different colors of a blood vessel's surface, thereby enabling a user to regulate a flow rate and duration of fluid injection as the amount of injected contrast fluid model is determined and rendered.

11. The method according to claim 10, wherein the contrast liquid density is calculated in real time for each position of the vascular net model to provide a time evolution for simulating contrast fluid diffusion in relation with elasticity of at least one blood vessel in the vascular net model.

12. The method according to claim 6, wherein:
the simulating vascular system deformation comprises modeling a mesh deformation using the plurality of polygon objects, which model the physical property of elasticity,
the mesh deformation is based on a pressure exercised from a balloon while at the same time the balloon expands based on a supplied pressure, and
a visualization of the balloon is obtained by interpolation of a curve.

13. The method according to claim 6, further comprising the step of simulating a stent in at least one blood vessel in the modeled internal system by simulating a metallic mesh, wherein:
each node of the metallic mesh is a particle with its own physical properties connected to other nodes according to an established design,
the physical properties of each node being assimilated to physical properties of a sphere, and
when the stent is simulated to deploy, spheres that represent each node of the metallic mesh are expanded assuming a speed that depends on the physical properties of the sphere such that an expansion of the simulated stent follows physics of an expansion of the metallic mesh.

14. The method according to claim 13, wherein a catheter is modeled with a sequence of cylinders interconnected with two degrees of rotational freedom, and when the cylinders interact with walls of the metallic mesh, the cylinders follow physical laws with which they have been modeled.

15. The method according to claim 14, wherein a system of springs and dampers is applied to the cylinders at each joint such that dumping and stiffness is defined for each joint.

16. The method according to claim 6, wherein the real-time interactive rendering of the internal system is obtained by generating a high precision value of each object's thickness at pixel level to determine an appearance of each object on the at least one monitor.

17. The method according to claim 16, wherein information related to each object's thickness is computed for each visualization scene from a 3D point of view to: obtain a volumetric rendering of ordinary polygon objects, render each closed convex and concave mesh as a thick volume, handle each polygon object's overlapping zone, and eliminate aliasing artifacts.

* * * * *